United States Patent [19]

Takahashi

[11] Patent Number: 4,979,116

[45] Date of Patent: Dec. 18, 1990

[54] METHOD AND DEVICE FOR REAR WHEEL STEERING SYSTEM OF AUTOMOTIVE VEHICLE

[75] Inventor: Akira Takahashi, Tokyo, Japan

[73] Assignee: Fuji Jukogyo Kabushiki Kaisha, Tokyo, Japan

[21] Appl. No.: 312,493

[22] Filed: Feb. 21, 1989

[30] Foreign Application Priority Data

Feb. 25, 1988 [JP] Japan .................................. 63-42809

[51] Int. Cl.$^5$ ............................................. B62D 6/02
[52] U.S. Cl. ................................ 364/424.05; 180/140; 280/91
[58] Field of Search ...................... 364/424.01, 424.05; 180/140–143; 280/91

[56] References Cited

U.S. PATENT DOCUMENTS

| | | | |
|---|---|---|---|
| 4,657,102 | 4/1987 | Kanazawa et al. | 180/140 |
| 4,687,214 | 8/1987 | Uno | 280/91 |
| 4,768,603 | 9/1988 | Sugiyama et al. | 180/140 |
| 4,779,693 | 10/1988 | Takahashi et al. | 180/140 |
| 4,796,904 | 1/1989 | Kubo et al. | 280/91 |
| 4,805,939 | 2/1989 | Kanazawa et al. | 280/91 |
| 4,811,805 | 3/1989 | Yoshida et al. | 180/140 |
| 4,828,064 | 5/1989 | Furutani et al. | 180/140 |

*Primary Examiner*—Thomas G. Black
*Attorney, Agent, or Firm*—Beveridge, DeGrandi & Weilacher

[57] ABSTRACT

A method and device for controlling the steering of the rear wheels of an automotive vehicle having a four-wheel steering system in which, at least in the vehicle medium or high speed range, the rear wheels are controlled to be steered in the coincident-phase direction relative to the front wheels in accordance with the steering force or the steering angle of the front wheels and with the front-wheel steering speed. The method and device are characterized by controlling, at medium or high vehicle speed, a rear-wheel steering speed reference value determined on the basis of the front-wheel steering speed in the direction for reducing the coincident-phase direction steering speed of the rear wheels for low front-wheel steering speed and in the direction for increasing the coincident-phase direction steering speed of the rear wheels for high front-wheel steering speed.

14 Claims, 3 Drawing Sheets

METHOD AND DEVICE FOR REAR WHEEL STEERING SYSTEM OF AUTOMOTIVE VEHICLE

BACKGROUND OF THE INVENTION

This invention relates generally to steering of automotive vehicles and more particularly to a method and system for controlling the rear wheel steering of a four-wheel steering system of an automotive vehicle (hereinafter referred to as vehicle).

There have been proposed and developed four-wheel steering systems of vehicles of the type where a reference value of the rear-wheel steering angle is determined from the steering angle of the steering wheel and the vehicle speed. And in accordance with this reference value, the rear wheels are steered. In these four-wheel steering systems, means for detecting the angular speed of the steering wheel is provided. And in accordance with the angular speed, a reference value of the rear-wheel steering speed is determined. Then, by steering at the speed of this reference value, rear-wheel steering without response delay can be realized. One example of these steering systems is disclosed in Japanese patent Laid-Open Publication No. 149562/1987.

It has been well known that, when the front wheels are steered at exceeding predetermined speed in a turn, steering the rear wheels in the same direction as that of the front wheels (so-called "coincident-phase steering") improves the stability of the vehicle. In a four-wheel steering system, this stability is improved by the front-/rear-wheel coincident-phase steering for high-speed driving. However, if the rear wheel steering speed is controlled in proportion to the steering wheel angular speed in the four-wheel steering system like the prior art so as to decrease the response delay of the rear wheel control, there arises the problem that steering sensitivity deteriorates in the front/rear-wheel coincident-phase steering during steering at medium or high speed driving (i.e, sluggishness of variation of the vehicle orientation relative to the steering action) arises. The driver feels uncomfortable.

SUMMARY OF THE INVENTION

It is an object of this invention to overcome the above described problem encountered heretofore.

According to this invention, there is provided a method for controlling the steering of the rear wheels of an automotive vehicle having a four-wheel steering system in which, at least in medium or high speed range, the rear wheels are steered in the coincident-phase direction relative to the front wheels in accordance with the steering force or the steering angle of the front wheels and with the front wheel steering speed. The method is characterized by controlling a rear-wheel steering speed reference value, at medium or high vehicle speed determined on the basis of the front-wheel steering speed so as to reduce the coincident-phase direction steering speed of the rear wheels at low front-wheel steering speed, and so as to increase the coincident-phase direction steering speed of the rear wheels at high front-wheel steering speed.

According to this invention in another aspect thereof, there is provided a rear-wheel steering control device of an automotive vehicle having a four-wheel steering system comprising, a computing device for calculating assist (or power) steering torque, a steering wheel rotational direction and speed sensor, a vehicle speed sensor, a rear-wheel steering angle sensor, a rear-wheel steering speed sensor, and a control unit responsive to detected signals from the computing device and the sensors and for steering the rear wheels, the rear-wheel steering control device having a rear-wheel steering reference value computing means. The control device comprises: a rear-wheel steering angle reference value computing means responsive to the output signals from the steering torque computing device and from the vehicle speed sensor and for generating a rear wheel steering angle reference value; a rear wheel steering angle deviation computing means responsive to said reference value and an actual value from the rear wheel steering angle sensor and for generating a deviation signal representing the deviation between the reference value and actual value; and a rear wheel steering speed reference value computing means responsive to the deviation signal, the first detected signal from the vehicle speed detecting means, the second detected signal from the front wheel steering speed detecting means and the detected signal from the rear wheel steering speed sensor and for generating a rear wheel steering speed reference value, which is transmitted to the rear-wheel steering means of the four wheel steering system. Thus, at least in the medium or high speed range of the vehicle speed, the rear wheels are controlled to steer in the coincident-phase direction relative to the front wheels in accordance with the steering angle of the front wheels and with the front-wheel steering speed. And at medium or high vehicle speeds, the rear wheel steering speed reference value is controlled to reduce the coincident-phase direction steering speed of the rear wheels at low front-wheel steering speed and to increase the coincident-phase direction steering speed of the rear wheels at high front wheel steering speed. The rear wheel steering speed reference value is determined in dependence on the front wheel steering speed.

As set forth above, while driving in normal condition, at medium or high vehicle speed, speed of the steering wheel is as slow as that of driving straight. And starting of the coincident-phase direction steering of the rear wheels is largely delayed comparing to that of the front-wheel steering As a result, changing direction of the vehicle becomes smooth, and a driver can feel comfortable And, while driving in a abnormal state as the steering wheel is turned abruptly at medium or high vehicle speed, the rear wheels are quickly steered in the coincident-phase direction faster than that of the front wheel steering. Thus, the safety of the vehicle can be improved.

The nature, utility, and further features of this invention will become understood from the following detailed description with reference to the accompanying drawings.

DETAILED DESCRIPTION OF THE INVENTION

Figure 1:
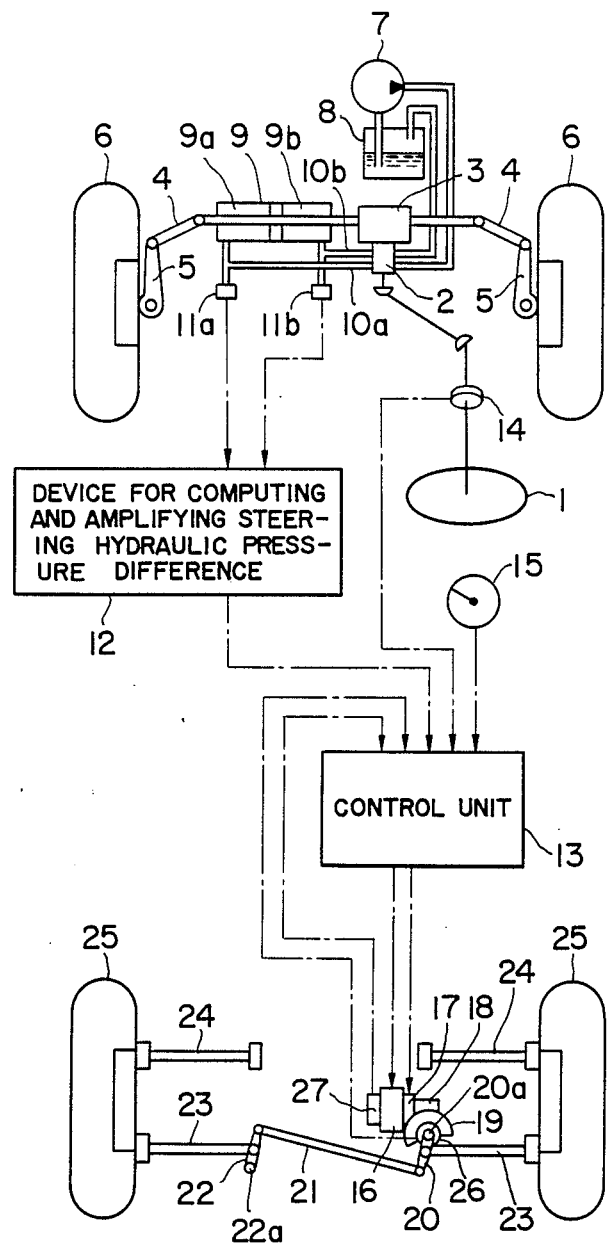
FIG. 1 is a combination of a schematic plan view and a block diagram showing a four wheel steering system of an automotive vehicle in which this invention is applied.

Referring to FIG. 1, front wheels 6 of the vehicle are steered by rotating the steering wheel 1. Rotational torque of the steering wheel is transmitted by way of a gear box 3 (for front-wheel steering), tie rods 4, and knuckle arms 5 to the front wheels 6. At the same time, the steering torque of the steering wheel 1 actuates a control valve 2. Then a pump delivers oil to one of left and right hydraulic chambers 9a and 9b of a hydraulic power cylinder 9 through either of left and right hydraulic lines. The pump 7 is driven by a vehicle engine (not shown). Assist torque is generated in a desired steering direction. Thus the manual turning force required to rotate the steering wheel is reduced. The pump 7 provides oil from a reservoir tank 8 to the chambers 9a and 9b, and excessive oil is returned to the tank 8.

Left and right hydraulic pressure sensors 11a and 11b are respectively installed at intermediate positions of the left and right hydraulic lines 10a and 10b. The sensors detect hydraulc pressures of the hydraulic lines 10a and 10b and transmit detected signals of hydraulic pressure to a device 12 for computing and amplifying steering hydraulic pressure difference.

This device 12 computes assist (or power) steering torque from the difference between the two output signals of the two hydraulic pressure sensors 11a and 11b and transmits an assist steering torque signal to a control unit 13.

The steering wheel mechanism comprises a steering wheel angular speed sensor 14 responsive to the rotation of the steering wheel 1. The steering wheel angular speed sensor 14 detects the steering rotational direction and angular speed thereof, and then transmits a steering angular speed signal to the control unit 13. A vehicle speed sensor 15 is provided to detect the vehicle speed and to transmit a vehicle speed signal to the control unit 13.

The rear wheels 25, 25 of the vehicle are mounted on the chassis frame (not shown) of the vehicle via a rear wheel suspension which includes rear lateral links 23 and front lateral links 24.

These rear wheels 25 are steered by a rear-wheel steering mechanism, comprising of which are: an electric motor 16 controlled by signals from the control unit 13; an electromagnetic clutch 17 actuated by the motor 16; a worm gear 18 rotatably connected to the clutch 17 to rotate a worm sector 19; a rotating shaft 20a connected to the worm sector 19; a right-side lever 20 fixed at one end to the rotating shaft 20a and pivoted at an intermediate position of the inner (left) end of the rear lateral link 23 on the right side; a connecting rod 21 connected at the right end thereof to the other end of the right-side lever 20; and a left-side lever 22 pivotably supported at its one end by a pivot shaft 22a and connected at its distal end to the left end of the connecting rod 21 and at an intermediate position of the right end of the rear lateral link 23 on the left side.

By this arrangement of mechanism, the rear lateral links 23 shift substantially in the left and right directions as the left-side and right-side levers 20 and 22 swing, and thus the rear wheels 25 are steered in the right or left direction.

Furthermore, the motor 16 assists the steering force in response to a control signal from the control unit 13. The output shaft of the motor 16 is coupled to the electromagnetic clutch 17, which has an exciting coil. When this exciting coil is supplied with current to switch "ON" and in an excitation state, the electromagnetic clutch 17 engages the shaft 18.

A rear-wheel steering angle sensor 26 is connected to the rotating shaft 20a of the worm sector 19 and the right-side lever 20 for detecting the steering angle thereof and transmitting its resulting detected signal to the control unit 13.

Furthermore, the rotational speed of the motor 16 is detected by a motor speed sensor 27, which also transmits its resulting detected signal to the control unit 13.

In a hydraulic-type power steering system as described above, since a steering assist torque by hydraulic pressure is generated in accordance with the torque of the steering wheel, the hydraulic pressure difference in the power cylinder 9 is proportional to the torque of the steering wheel 1. Moreover, this hydraulic pressure difference is also proportional to the holding torque of the steering wheel 1 in dependence on the cornering force of the front wheels 6. Therefore, a signal M from the device 12 for computing and amplifying the steering hydraulic pressure difference is fed into the control unit 13. The signal M is a detected signal of the front-wheel assist torque. At the same time, the signal M can be also regarded as a detected signal of the front-wheel steering torque or of the front-wheel cornering force. Thus these signals are collectively regarded as the steering force signal M of the front wheels.

Figure 2:
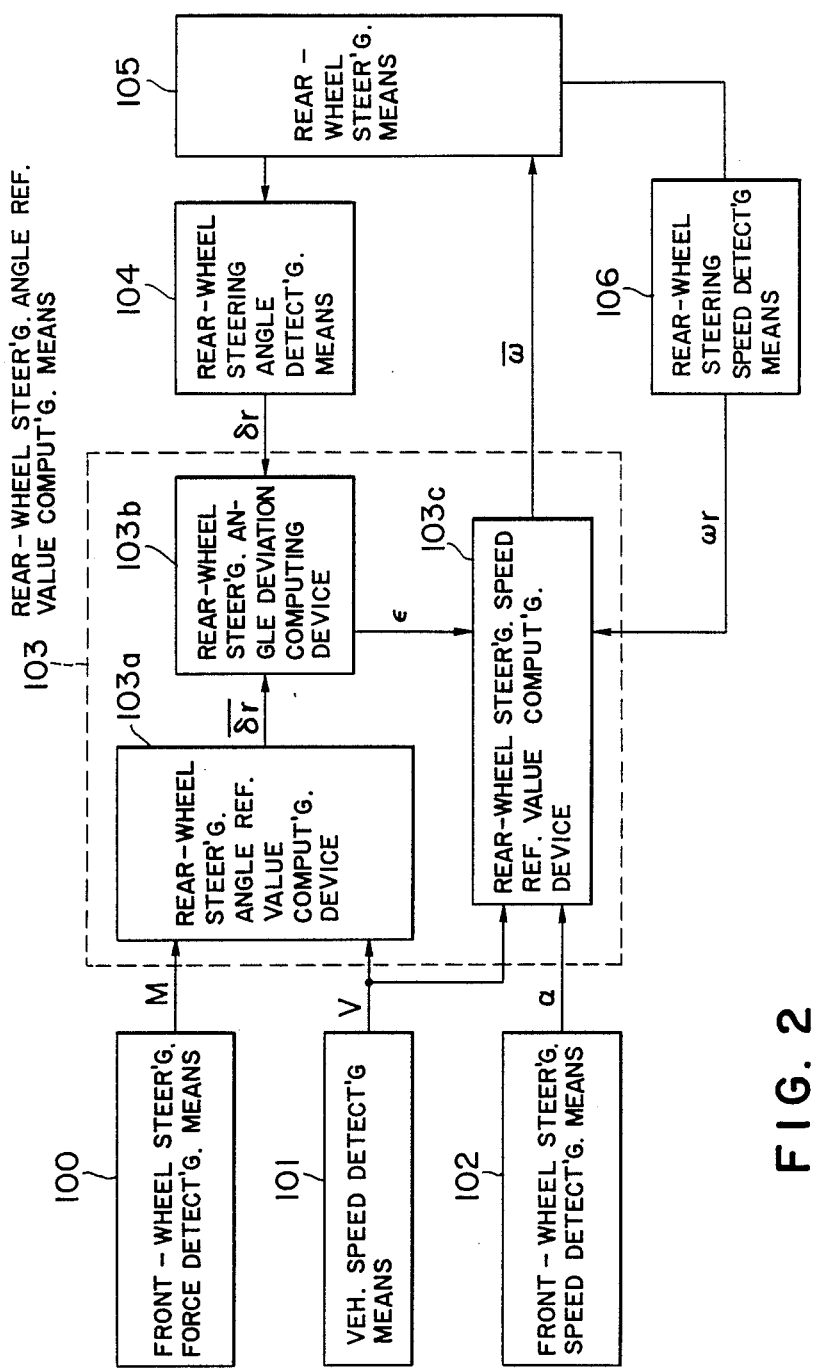
FIG. 2 is a block diagram of a rear-wheel steering system in which the steering control method and device according to this invention is applied.

The control unit 13 has calculating means 103 of a rear-wheel steering reference value computing device 103a, a rear-wheel steering angle deviation computing device 103b, and a rear-wheel steering speed reference value computing device 103c. As shown in FIG. 2, this computing means 103 receives the front-wheel steering force singal M from a front-wheel steering force detecting means 100 comprising the hydraulic pressure sensors 11a and 11b and the device 12 for computing and amplifying steering hydraulic pressure difference, and a vehicle speed signal V of a vehicle speed detecting means 101 comprising the vehicle speed sensor 15.

In this computing means 103, these input signals M and V are fed to rear-wheel steering angle reference value computing device 103a. According to the signals M, the rear wheel steering angle reference value computing device computes a rear-wheel steering angle reference value $\overline{\delta r}$. A rear-wheel steering angle detecting means 104 comprising the rotational angle sensor 26 operates to detect the actual value of the rear wheel steering angle $\delta r$. Rear wheel steering angle deviation computing device 103b receives these values $\overline{\delta r}$ and $\delta r$ and computes the deviation $\epsilon$ thereof and transmits this deviation to rear wheel steering speed reference value computing device 103c.

Figure 3:
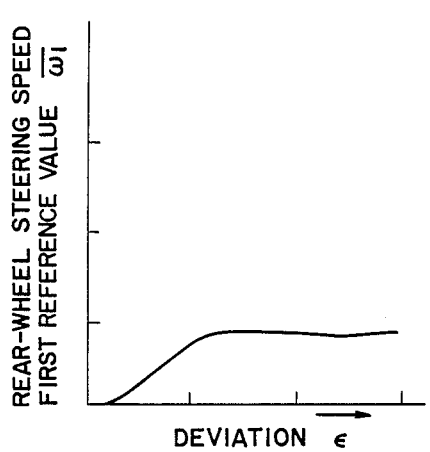
FIG. 3 is a graph indicating the relationship between a first reference value of the rear-wheel steering speed and deviation of the value.

Device 103c operates in accordance with the deviation $\epsilon$ to determine a first reference value $\overline{\omega_1}$ of the rear-wheel steering speed according to the magnitude of the deviation $\epsilon$ for reducing this deviatin $\epsilon$ as shown in FIG. 3. At the same time, device 103c determines a second reference value $\overline{\omega_2}$ of the rear wheel steering speed from the front wheel steering speed $\alpha$ detected by front-wheel steering speed detecting means 102. Front wheel steering speed detecting means 102 comprises the steering wheel angular speed sensor 14. Front wheel steering speed detecting means 102 determines a rear-wheel steering speed reference value $\bar{\omega}$ by summing up the two reference values $\bar{\omega_1}$ and $\bar{\omega_2}$. This reference value $\bar{\omega}$ is transmitted to rear-wheel steering means 105 comprising the motor 16, whereby rear-wheel is steered at speed of the reference value $\bar{\omega}$.

The steering speed of the rear wheels is used for feedback control as a rear-wheel steering speed signal $\omega r$ from rear-wheel steering speed detecting means 106 comprising the motor speed sensor 27.

Figure 4:
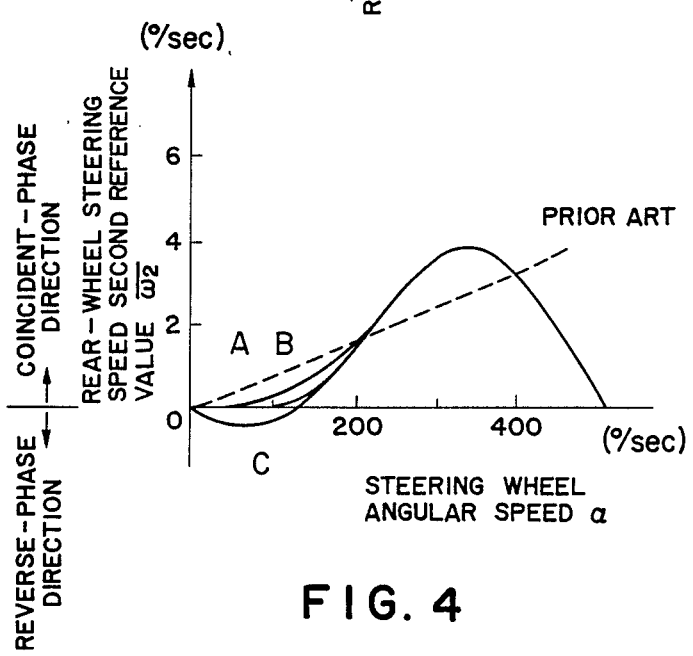
FIG. 4 is a graph indicating the relationship between a second reference value of the rear-wheel steering speed and steering wheel angular speed.

The above mentioned second reference value $\bar{\omega_2}$ of the rear wheel steering speed was determined on the characteristic of being proportional to the steering wheel angular speed (i.e., front-wheel steering speed) as indicated by a dotted line in FIG. 4. This second reference value $\bar{\omega_2}$ of the rear-wheel steering speed determined proportionally to the front-wheel steering speed is added to the first reference value $\bar{\omega_1}$ of the rear-wheel steering speed determined by the deviation $\epsilon$ of the rear-wheel steering angle reference value $\bar{\delta r}$ and the actual value $\delta r$ of the rear wheel steering angle. Thus an actual value of the rear-wheel steering speed is determined. By this procedure, the larger the deviation $\epsilon$ the more rapidly the rear-wheel steering is steered. Accordingly, safety is improved.

However, during driving at medium or high speed, in a normal driving condition, greater importance is placed on maneuverability or controllability of the vehicle rather than safety. When driving at medium or high speed in the state of front/rear-wheel coincident-phase steering as in the prior art, the rear wheels are always steered with good response by the coincident phase steering, i.e., as the rear wheels are steered in the same direction as the front wheels, turning of the vehicle is slow in spite of the larger amount of steering. This is, called as dull steering the driver feels uncomfortable.

Therefore, according to the invention, while driving at medium or high speed, the rear-wheel steering speed relative to the steering wheel angular speed (i.e., front-wheel steering speed) is slow in the range of low steering wheel angular speed, and the rear-wheel coincident-phase direction steering speed is increased in the range of high steering wheel angular speed (for example, the range of 200 degrees/sec. to 400 degrees/sec.), for example, as indicated by curve A, B, or C in FIG. 4. The second reference value $\bar{\omega_2}$ of the rear-wheel steering speed obtained by this characteristic is added to the first reference value of the rear-wheel steering speed obtained on the basis of the characteristic indicated in FIG. 3. The reference value $\bar{\omega}$ of the rear-wheel steering speed thus obtained is transmitted to rear-wheel steering means 105 thereby to control the rear wheel steering speed.

That is, when front-wheel is steered at an exceeding predetermined vehicle speed, the rear-wheel steering angle reference value $\bar{\delta r}$ of the coincident-phase direction of the front wheels is determined according to the front-wheel steering force signal M. From the deviation $\epsilon$ between this reference value $\bar{\delta r}$ and the actual value $\delta r$, the first reference value $\bar{\omega_1}$ of the rear-wheel steering speed is determined, as stated hereinbefore.

In this case, while driving straight, for example, wherein the steering wheel is turned slowly, the second reference value $\bar{\omega_2}$ of the rear-wheel steering speed is very small as indicated by solid-line curve A in FIG. 4. The reference value $\bar{\omega}$ of the rear-wheel steering speed determined from the sum of the values $\bar{\omega_1}$ and $\bar{\omega_2}$ does not add to the coincident-phase direction steering of the rear wheels. Then, driving performance of the vehicle thus is improved. As another example, when the steering wheel is slowly turned as indicated by curve B in FIG. 4, the second reference value $\bar{\omega_2}$ of the rear-wheel steering speed becomes zero. The rear-wheel steering speed is therefore determined only by the first reference value $\bar{\omega_1}$ and becomes more slower than that of the curve A.

In the case of the example indicated by curve C in FIG. 4, when the front-wheel steering speed is in the low range, the value $\bar{\omega_2}$ becomes the second reference value of the rear-wheel steering speed of the reverse-phase direction. Then the sum of $\bar{\omega_1}$ and $\bar{\omega_2}$ at the start of turning of the steering wheel becomes a negative (minus) value. That is, by reverse-phase steering, the rear wheels are steered slightly in a reverse direction. Thereafter, as a result of this reverse-phase steering, the deviation $\epsilon$ between an actual value $\delta r$ of the rear-wheel steering angle and the rear-wheel steering angle reference value $\bar{\delta r}$ of the coincident-phase direction increases, and first reference value $\bar{\omega_1}$ of the rear-wheel steering speed also increases. Moreover, as the wheel steering approaches its termination, the front-wheel steering speed decreases and finally becomes zero. As a consequence, the second reference value $\bar{\omega_2}$ of the rear-wheel steering speed approaches zero and finally becomes zero.

Therefore, the rear wheels are steered in the direction for causing the deviation $\epsilon$ to become zero, that is, in the coincident-phase direction. In this manner, at the start of the steering wheel turning manipulation, the rear-wheel steering is so controlled that the rear wheels are steered slightly in reverse-phase steering and thereafter they are steered in the coincident-phase direction. Thus, the steering action becomes sharper than in the cases of the curves A and B in FIG. 4, whereby light and comfortable driving feel is realized.

On the other hand, when the steering wheel is turned abruptly during driving at high speed, that is in a sort of abnormal state of steering. In such a case, the second reference value $\bar{\omega_2}$ of the rear-wheel steering speed becomes much higher in the coincident-phase direction than that of normal driving condition. Therefore, the reference value $\bar{\omega}$ of the rear-wheel steering speed determined by adding $\bar{\omega_1}$ and $\bar{\omega_2}$ becomes high, and the rear wheels are steered in the coincident-phase direction by the instantaneous and abrupt manipulation of the steering wheel, whereby the safety of the vehicle is assured.

However, when the rear-wheel steering speed is high in this manner, the rear wheels are steered in a larger steering angle than that of the reference value $\bar{\delta r}$ of the rear-wheel steering angle. In such a case, a deviation $\epsilon$ of reverse direction relative to the steering direction occurs, and the first reference value $\bar{\omega_1}$ of the rear-wheel steering speed is produced, whereby the rear wheels are returned to the reverse-phase direction. However, as indicated in FIG. 3, the upper limit of the magnitude of the first reference value $\bar{\omega_1}$ of the rear-wheel steering speed is held at a relatively low level, and the rear wheels are returned slowly. Thus there is no problem.

By abnormal vibration of the steering wheel, an abnormal rapid steering wheel angular speed develops in some cases. In such a case, in order to prevent the abnormal occurrence of rear-wheel steering speed, the second reference value $\omega_2$ of the rear-wheel steering speed in an abnormal range becomes zero as indicated by the solid-line curves in FIG. 4.

Figure 5:
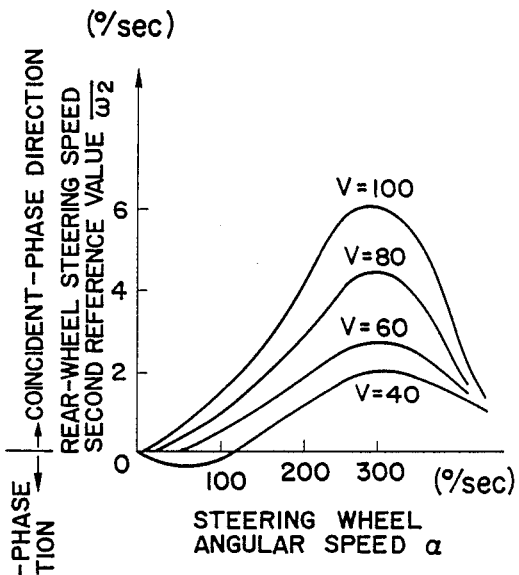
FIG. 5 is a graph indicating another example of the relationship between a second reference value of the rear-wheel steering speed and the steering wheel angular speed.

In another embodiment of this invention as shown in FIG. 5, the relationship between the steering wheel angular speed (i.e., front-wheel steering speed) and the second reference value of the rear-wheel steering speed is mapped in a way that the degree of coincident-phase steering is higher as the vehicle speed V becomes high.

Also in this example when the driving procedure is normal in which the steering wheel is manipulated slowly at any speed, the coincident-phase direction steering speed of the rear wheels is largely reduced, and the coincident-phase direction steering of the rear wheels is more slower than that of the normal conditions. At the time of steering under the condition or the abnormal state wherein the steering wheel is turned abruptly, the coincident-phase direction steering of the rear wheels is more rapid than that of normal conditions as illustrated in FIG. 4.

In the above described example, according to the invention, the reference value $\overline{\delta r}$ of the rear-wheel steering angle is determined in dependence on the steering force of the front wheels, but it is possible that the reference value of the rear-wheel steering angle is determined in dependence on the front-wheel steering angle. Furthermore, the rear-wheel steering mechanism is not limited to the illustrated examples.

As described hereinabove, this invention has the following features of merit. According to the invention, there are provided a method and a device for controlling to steer the rear wheels of a motor vehicle in which: a reference value of the rear-wheel steering angle is determined from the steering froce or the steering angle of the front wheels; at the same time, a reference value of the rear-wheel steering speed is determined from the deviation value between the rear-wheel steering angle reference value and the actual value of the rear-wheel steering angle and from the front-wheel steering speed; and, during driving at medium or high speed, the rear wheels are steered in the same direction as the front-wheel steering direction in accordance with the reference value thus determined, and the rear wheels are steered at a steering speed according to the reference value thus determined. In the method and device, furthermore, at medium or high vehicle speed, the rear-wheel steering speed reference value is controlled to reduce the coincident-phase direction steering speed of the rear wheels in the range of low front-wheel steering speed. But, in the range of high front-wheel steering speed, it is controlled to increase the coincident-phase direction steering speed of the rear wheels. In the normal driving state, wherein the steering wheel is manipulated slowly as the vehicle is driven at medium to high speeds, the rear-wheel coincident-phase direction steering is largely delayed relative to the front-wheel steering. Therefore the response to the steering reaction is sharp, and it is possible to obtain a pleasant drive feeling. On the other hand, at the time of driving in abnormal state such as abrupt turning of the steering wheel during high-speed driving, the rear wheels are quickly steered in the same direction relative to the front-wheel steering. Thus, safety is improved. Therefore, improvement of the driving performance and the safety driving of the vehicle at medium or high speed can be obtained at the same time.

What is claimed is:

1. A method for controlling rear-wheel steering of an automotive vehicle having a steering wheel, front wheels, rear wheels, a front-wheel steering mechanism operatively connected to the steering wheel for operating the front wheels, a rear-wheel steering mechanism for operating the rear wheels, a detection device for detecting an assist steering torque, a first sensor for sensing a rotational direction and speed of the steering wheel, a second sensor for sensing a vehicle speed, a third sensor for sensing an actual rear-wheel steering angle, a fourth sensor for sensing a front-wheel steering speed, a fifth sensor for sensing a rear-wheel steering speed, and a control unit responsive to output signals from said detection device and said sensors for controlling the rear-wheel steering mechanism to steer the rear wheels in a coincident-phase direction relative to the front wheels in a medium or high vehicle speed region, said method comprising the steps of:

computing a reference rear-wheel steering angle in response to said assist steering torque from said detection device and said vehicle speed from said second sensor;

calculating a deviation between said reference rear-wheel steering angle from said computing step and said actual rear-wheel steering angle from said third sensor;

determining a reference rear-wheel steering speed in response to said deviation from said calculating step and output signals from said second, fourth, and fifth sensors, said reference rear-wheel steering speed being varied depending on said front-wheel steering speed from said fourth sensor to reduce a coincident-phase direction steering speed of the rear wheels for low front-wheel steering speed and to increase the coincident-phase direction steering speed of the rear wheels for high front-wheel steering speed; and controlling said rear-wheel steering mechanism to steer said rear wheels in response to said reference rear-wheel steering speed from said determining step until said deviation reaches zero.

2. The method as claimed in claim 1, wherein said reference rear-wheel steering speed is controlled to become zero for low front-wheel steering speed.

3. The method as claimed in claim 1, wherein said reference rear-wheel steering speed is controlled to become reverse-phase direction for low front-wheel steering speed.

4. The method as claimed in claim 1, wherein, for abnormally high front-wheel steering speed, said reference rear-wheel steering speed is controlled to become zero.

5. The method as claimed in claim 1, wherein the reference rear-wheel steering speed as a whole is varied toward coincident-phase direction as the vehicle speed increases and toward reverse-phase direction as the vehicle speed decreases.

6. The method as claimed in claim 1, wherein the rear wheels are controlled to steer in a coincident-phase direction relative to front wheels in accordance with steering force.

7. A rear-wheel steering control device of an automotive vehicle having a four-wheel steering system comprising a computing device for computing assist steering torque, a sensor of steering wheel rotational direction and speed, a vehicle speed sensor, a rear-wheel rotational angle sensor, a front-wheel steering speed detecting means, rear-wheel steering speed detecting means, and a control unit responsive to said computing device and said four sensors and for operating to steer the rear wheels, said rear-wheel steering control device for computing a rear-wheel steering reference value comprises:

rear-wheel steering angle reference value computing means responsive to output signals from the computing device for computing said assist steering torque and from said vehicle speed sensor and for generating a rear-wheel steering angle reference value;

rear-wheel steering angle deviation computing means responsive to said reference value and an actual value from said rear-wheel rotational angle sensor and for generating a deviation signal representing the deviation between said reference value and the actual value; and rear-wheel steering speed reference value computing means responsive to said deviation signal, a detected signal from said vehicle speed sensor, a detected signal from said front-wheel steering speed detecting means, and a detected signal from said rear-wheel steering speed detecting means for generating a rear-wheel steering speed reference value, which is transmitted to rear-wheel steering control means of said four-wheel steering system, so as to control the rear wheels to be steered in the coincident-phase direction relative to the front wheels in accordance with steering angle of the front wheels and with the front-wheel steering speed at least in a vehicle medium or high speed regions, and vary said rear-wheel steering speed reference value determined in dependence on said front-wheel steering speed to reduce the coincident-phase direction steering speed of the rear wheels for low front-wheel steering speed and to increase the coincident-phase direction steering speed of the rear wheels for high front-wheel steering speed.

8. The rear-wheel steering control device as claimed in claim 7, wherein said rear-wheel steering speed reference value is controlled to become zero for low front-wheel steering speed.

9. The rear-wheel steering control device as claimed in claim 7, wherein the direction of said rear-wheel steering speed reference value is controlled to be reverse-phase direction for low front-wheel steering speed.

10. The rear-wheel steering control device as claimed in claim 7, wherein the said rear-wheel steering speed reference value is controlled to be zero for abnormally high front-wheel steering speed,.

11. The rear-wheel steering control device as claimed in claim 7, wherein said rear-wheel steering speed reference value as a whole is varied toward coincident-phase direction as the vehicle speed increase and toward reverse-phase direction as the vehicle speed decrease.

12. The rear-wheel steering control device as claimed in claim 7, wherein the rear wheels are controlled to steer in a coincident-phase direction relative to front wheels in accordance with steering force.

13. A rear-wheel steering control device as claimed in claim 7, wherein said rear-wheel steering reference value comprises a first reference value and a second reference value.

14. A rear-wheel steering control device as claimed in claim 13, wherein said first reference value is determined by said deviation signal and wherein said second reference value is determined by said front-wheel steering speed.

* * * * *